United States Patent [19]

Kawaguchi et al.

[11] Patent Number: 4,712,638
[45] Date of Patent: Dec. 15, 1987

[54] SUSPENSION SYSTEM FOR MOTORCYCLES

[75] Inventors: Takeshi Kawaguchi; Akio Kawano, both of Saitama, Japan

[73] Assignee: Honda Giken Kogyo Kabushiki Kaisha, Tokyo, Japan

[21] Appl. No.: 878,414

[22] Filed: Jun. 25, 1986

[30] Foreign Application Priority Data

Jun. 25, 1985 [JP] Japan .................. 60-138186
Jun. 25, 1985 [JP] Japan .................. 60-138184

[51] Int. Cl.⁴ .......................................... B62K 25/16
[52] U.S. Cl. ..................... 180/219; 280/275; 280/277
[58] Field of Search ............... 180/219; 280/281 R, 280/275, 277, 276, 284

[56] References Cited

U.S. PATENT DOCUMENTS 4,265,329  5/1981  de Corlanze .................. 180/219
4,526,249  7/1985  Parker .......................... 180/219
4,540,193  10/1985  Noda et al. ................... 180/219

Primary Examiner—John J. Love
Assistant Examiner—Donn McGiehan
Attorney, Agent, or Firm—Lyon & Lyon

[57] ABSTRACT

A motorcycle having front and rear swing arm suspension systems. The motorcycle includes a structural frame including as a structural element the engine of the vehicle along with a support member. The front and rear suspensions are disclosed as being pivotally mounted to the support member. The cushion members are shown mounted to either the support member or directly to the engine. At the other end of the cushion members, progressive linkage mechanisms are employed.

4 Claims, 9 Drawing Figures

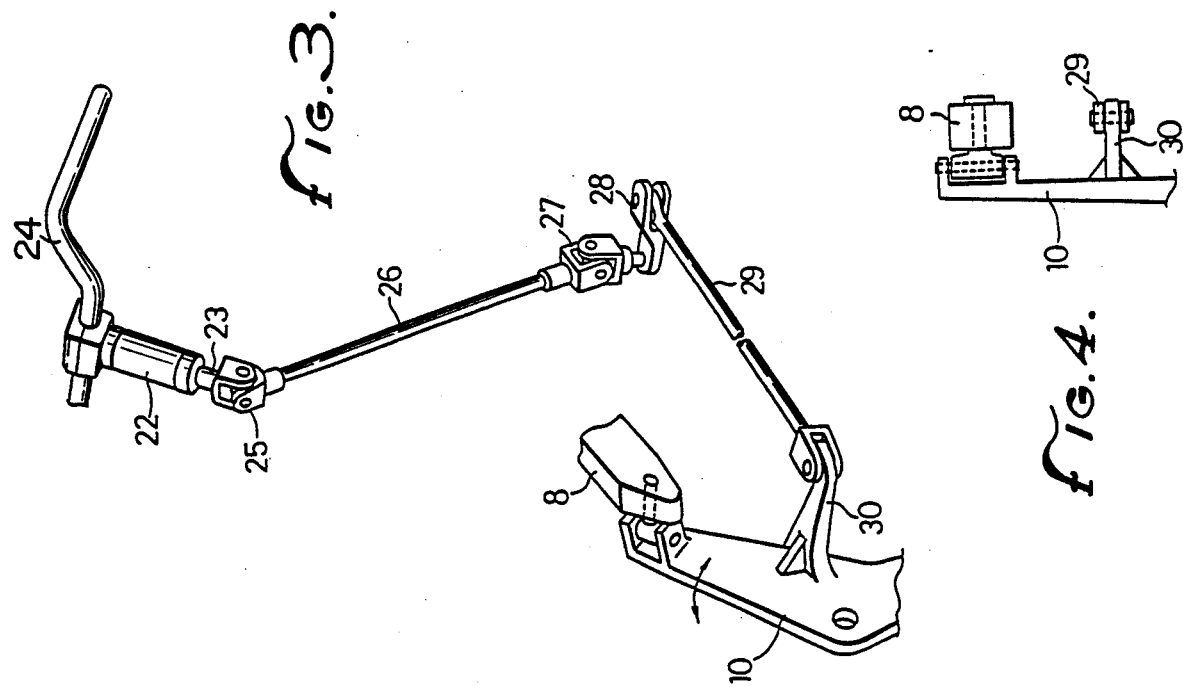
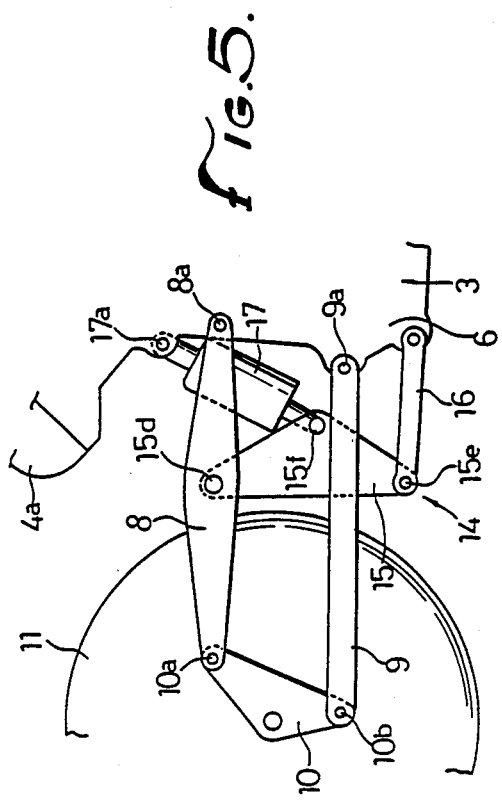
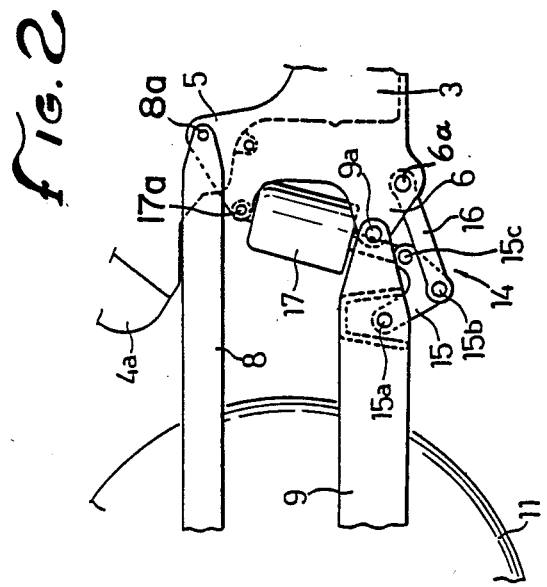

SUSPENSION SYSTEM FOR MOTORCYCLES

BACKGROUND OF THE INVENTION

The field of the present invention is front suspension systems for motorcycles.

Motorcycles have been devised which incorporate a front suspension mechanism using a front swing arm instead of a conventional front fork suspension mechanism. One such motorcycle is illustrated in Japanese Patent Publication No. 58-49435, U.S. Pat. No. 4,265,329. In such prior swing arm front suspension motorcycles, a connecting plate has typically been fixed to either sidewall of the engine which is located at the center of the motorcycle body. The swing arm of such a vehicle is typically connected to the connecting plate at the proximal end thereof and to a steering plate at the distal end thereof. The steering plate rotatably supports a front wheel. A cushion unit typically extends between the swing arm and the connecting plate affixed to the engine. Such a system is specifically illustrated in the aforementioned patent.

Difficulties have been encountered with such arrangements. With the cushion member fixed at one end to the swing arm, the swing arm is proportional to the stroke of the cushion unit. This results in a relatively rough ride on adverse road conditions.

One of the specific advantages of the structural architecture of such motorcycles employing a front swing arm is a reduction in overall weight. However, the mounting of the cushion member to frame members associated with the power unit requires substantial strength for the supporting frame member or connecting plate. As a result, such mounting plates are typically quite heavy, detracting from the overall weight advantage of such motorcycle designs.

SUMMARY OF THE INVENTION

The present invention is directed to swing arm front suspension mechanisms for small vehicles and, more specifically, advantageous mounting systems for cushion members associated with such front swing arm suspension systems.

In a first aspect of the present invention, a progressive linkage mechanism is incorporated between the frame structure of the vehicle and the swing arm which provides a point of progressive movement relative to the movement of the swing arm. A cushion member is coupled at such a point rather than directly to the swing arm to obtain an advantageous response relationship to movement of the swing arm. In this way, the vehicle provides a more comfortable or pleasing ride on a wider range of road conditions.

In another aspect of the present invention, one end of the cushion member is mounted directly on or at the power unit which forms a part of the frame structure. For other considerations, the power units typically are relatively strong structures which can withstand the forces imposed by such a cushion unit. By mounting such a cushion unit to the power unit, a relatively heavy mounting bracket associated with other structural components of the vehicle can be avoided or reduced in size and weight.

Accordingly, it is an object of the present invention to provide an improved suspension system for small vehicles. Other and further objects and advantages will appear hereinafter.

BRIEF DESCRIPTION OF THE DRAWINGS

FIG. 2 is a detailed side view of the front suspension system of the motorcycle of FIG. 1.

FIG. 3 is a perspective view of the steering linkage of the motorcycle of FIG. 1.

FIG. 4 is a front view of a portion of the steering linkage of FIG. 3.

FIG. 5 is a detailed view of a front suspension system illustrating a second embodiment of the present invention.

DETAILED DESCRIPTION OF THE PREFERRED EMBODIMENT

Figure 1:
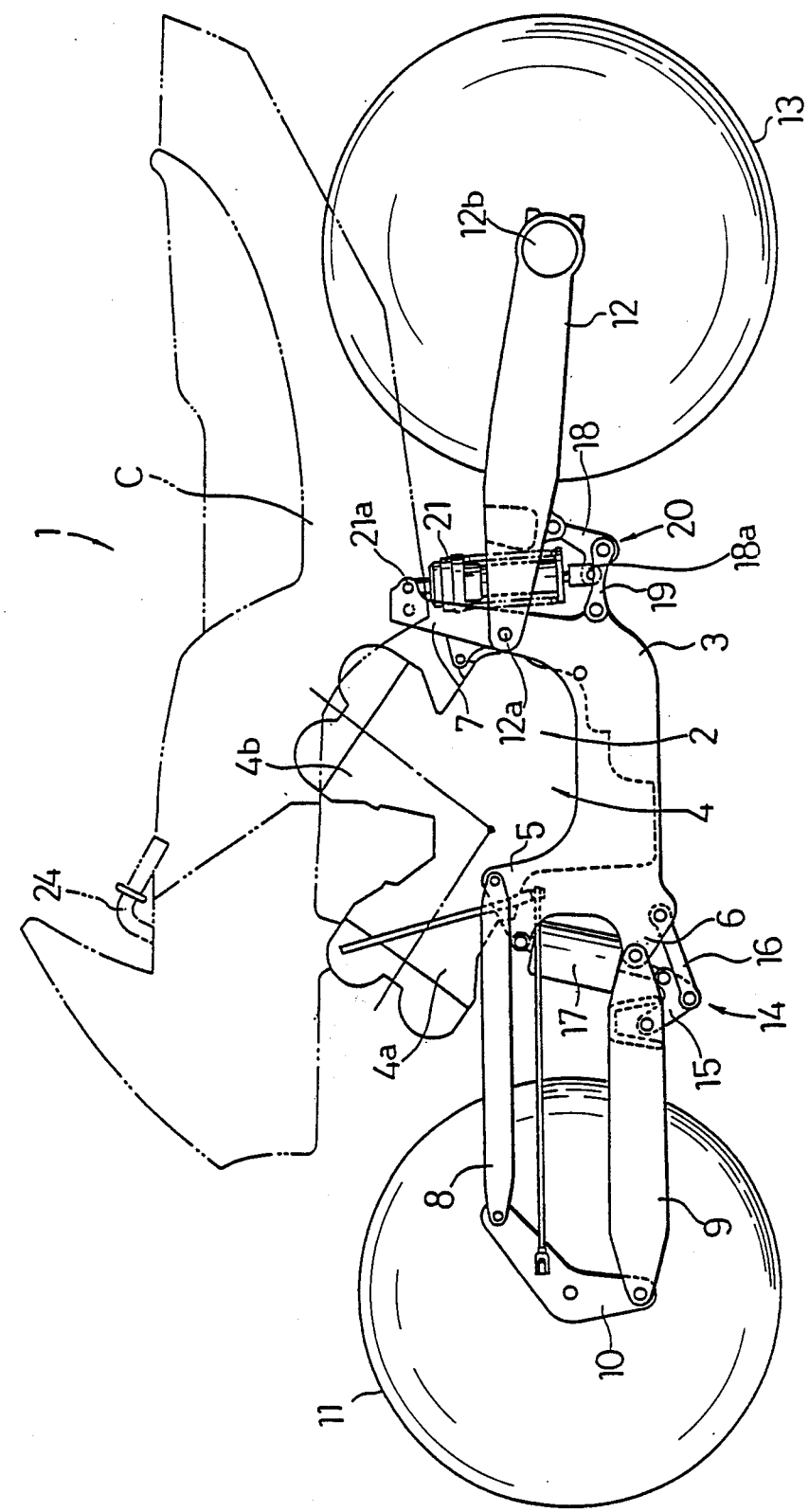
FIG. 1 is a side view of a motorcycle of the present invention illustrating the body portions in phantom.

Turning in detail to the drawings, FIGS. 1 through 4 illustrate a first embodiment of the present invention. The motorcycle, generally designated 1, has at its center a power unit 2 consisting of a V-type engine 4 having a forwardly leaning front cylinder block 4a and a rearwardly leaning rear cylinder block 4b. A support member 3 is illustrated to define a frame structure in association with the engine 4. The support member 3 may be made of steel plate, an integral casting of an aluminum alloy, a laminate of an aluminum alloy plate and a carbon fiber-reinforced panel or a laminate of fiber-reinforced plastic panels and an aluminum honeycomb plate. Other similar structures may be employed with minimum weight and maximum strength in mind. The support member 3 is shown in this embodiment to be in the form of a channel having right and left sidewalls integrally connected with a bottom wall extending between the left and right sidewalls. A front end of each sidewall is provided with an upper projection 5 and a lower projection 6. The rear end of each sidewall is provided with an upper projection 7. Both of the upper projections 5 and 7 are connected to the power unit 4 to increase the strength of the entire structure.

Pivotally supported by the upper projection 5 is the proximal end 8a of a substantially horizontally disposed upper front swing arm 8. Pivotally supported by the lower projection 6 is the proximal end 9a of a lower front swing arm 9. These swing arms 8 and 9 are outwardly bent, but are generally parallel and swing in a vertical plane relative to the vehicle. The front or distal ends of the swing arms 8 and 9 are pivotally connected to the upper and lower ends 10a and 10b of a steering plate 10. The steering plate 10 in turn rotatably supports a front wheel 11 intermediate the upper and lower ends 10a and 10b thereof.

Pivotally supported by the rear upper projection 7 is the proximal end 12a of a rear swing arm 12. The distal end of the rear swing arm 12 rotatably supports a rear wheel 13.

Provided between the lower front swing arm 9 and the lower projection 6 of the support member 3 is a link mechanism, generally designated 14, as can best be seen in FIG. 2. This linkage 14 consists of an L-shaped cushion arm 15 whose front end 15a is pivotally connected to the lower front swing arm 9 just forwardly of the rear end thereof. A cushion extends substantially parallel to the lower front swing arm 9 and has its opposite ends pivotally connecting rod 16 for connecting a middle portion 15b of the L-shaped cushion arm 15 and the lower projection 6 at 15c, respectively. The point of connection indicated as 6a of the rear end of the connecting rod 16 to the lower projection 6 is located rearwardly of the rear end 9a of the lower swing arm 9, while that indicated as 15b of the forward end of rod 16 to the cushion arm 15 is disposed forwardly of the end 9a of the lower swing arm. A rear end 15c of the L-shaped cushion arm 15 is pivotally connected to a lower end of a cushion unit 17. This rear end 15c of the L-shaped cushion arm 15 constitutes a point on the linkage which experiences progressive motion responsive to the pivotal motion of the swing arm 9. Thus, for example, if the swing arm moves upwardly at a constant rate, the point 15c on the linkage will move up at a progressively more rapid rate. The upper end 17a of the cushion unit 17 is in turn mounted to the upper projection 5 of the support member 3. The suspension mechanism including the swing arms 8 and 9, the link mechanism 14 and the cushion unit 17 provides the front suspension for the front wheel 11 mounted to the steering plate 10. This arrangement provides good progressive characteristics which may be configured by changing the relative position and size of the components to provide a range of progressive rates for the cushion unit 17.

Also provided between the rear swing arm 12 and the rear end of the support member 3 is a linkage 20 of a similar construction to the linkage 14. The linkage 20 consists of an L-shaped cushion arm 18 and a cushion connecting rod 19. The front end 18a of the cushion arm 18 supports one end of a cushion unit 21 whose upper end 21a is in turn supported by the upper projection 7 of the support member 3. The rear swing arm, the linkage mechanism 20 and the cushion unit 21 constitute a rear suspension system which is also configured to provide progressive cushion motion relative to the rear swing arm.

Above the power unit 2, motorcycle equipment such as a fuel tank and an air cleaner case are mounted to the engine 4. These mountings are provided by means of substays and other elements which are covered over by a cowling C, illustrated in phantom. A journal 22 for a steering mechanism is fixed to a bracket mounted on one of the upper components on the vehicle such as the air cleaner case. This steering journal or pivot 22 receives a steering stem 23 as can best be seen in FIG. 3. An upper end of the steering stem 23 is fixed to a handlebar 24. A lower end of the steering stem 23 is connected to an upper end of a steering rod 26 by means of a connecting joint 25 such as a universal joint. A lower end of the steering rod 26 is connected by means of a second joint 27 to an arm 28 pivotally supported on the upper projection 5 of the support member 3.

The arm 28 is in turn pivotally connected to one end of a linking rod 29. The other end of the linking rod 29 is pivotally connected to a lever 30 projecting sideways from the steering plate 10, as can best be seen in FIG. 4. Thus, movement of the steering handle 24 is transmitted to the steering plate 10 through the steering stem 23, the steering rod 26 and the linking rod 29. The rotation of the steering plate 10 operates to steer the front wheel 11.

FIG. 5 illustrates another embodiment of the front suspension system. Corresponding reference numerals to the first embodiment are employed where identical or equivalent elements are disclosed. In the embodiment of FIG. 5, a cushion arm 15 of a triangular shape has an upper end 15d pivotally connected to a middle portion of the upper front swing arm 8. A lower end 15e of the cushion arm 15 is connected to the lower projection 6 by way of the cushion rod 16. A middle portion 15f supports the lower end of the cushion 17. The link mechanism consisting of the cushion arm 15 and the cushion connecting rod 16 of course may be modified to accommodate different rates of progression as may be desired.

Figure 6:
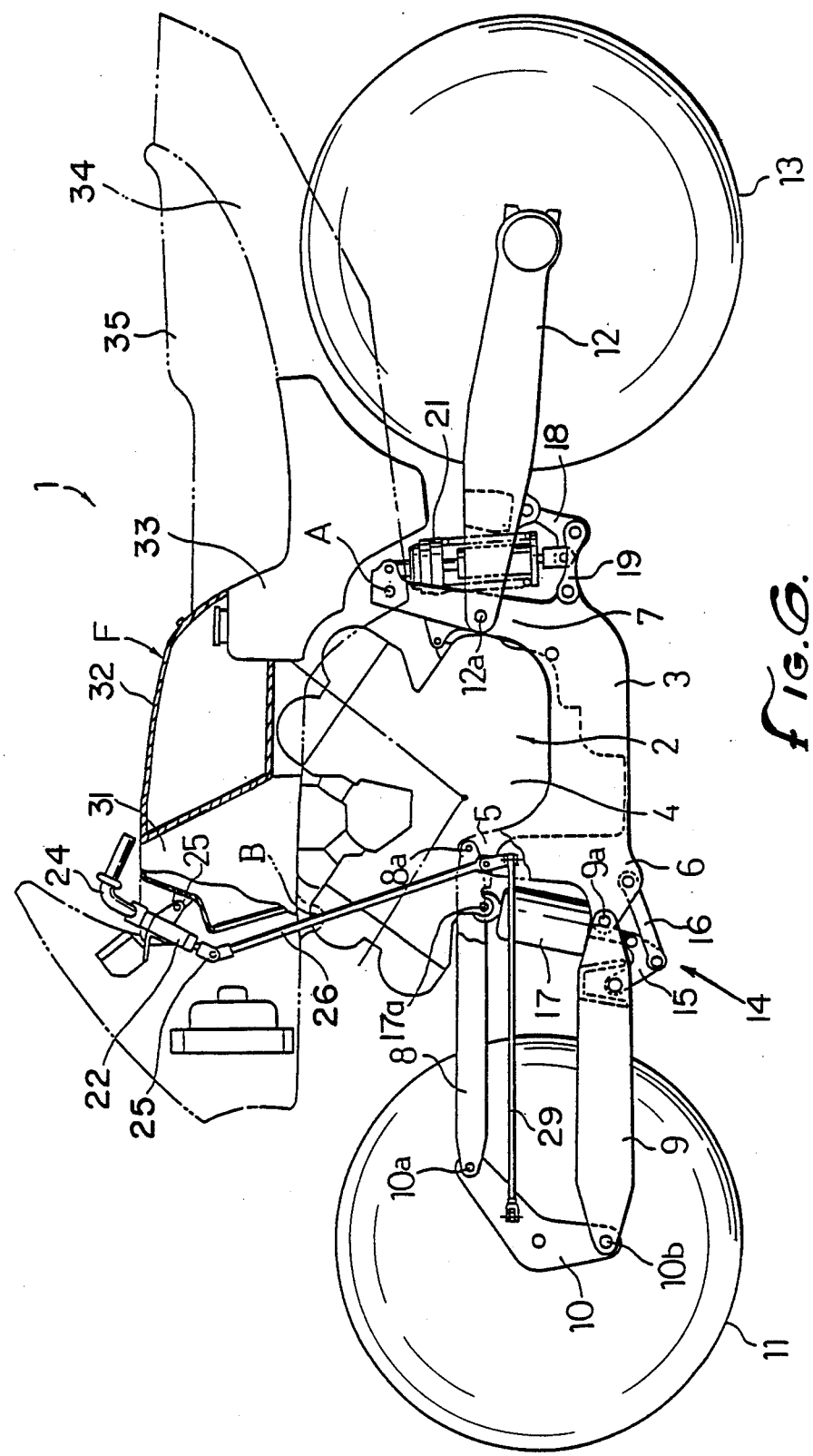
FIG. 6 is a side view of yet another embodiment of the present invention with the body portions principally in phantom.
Figure 7:
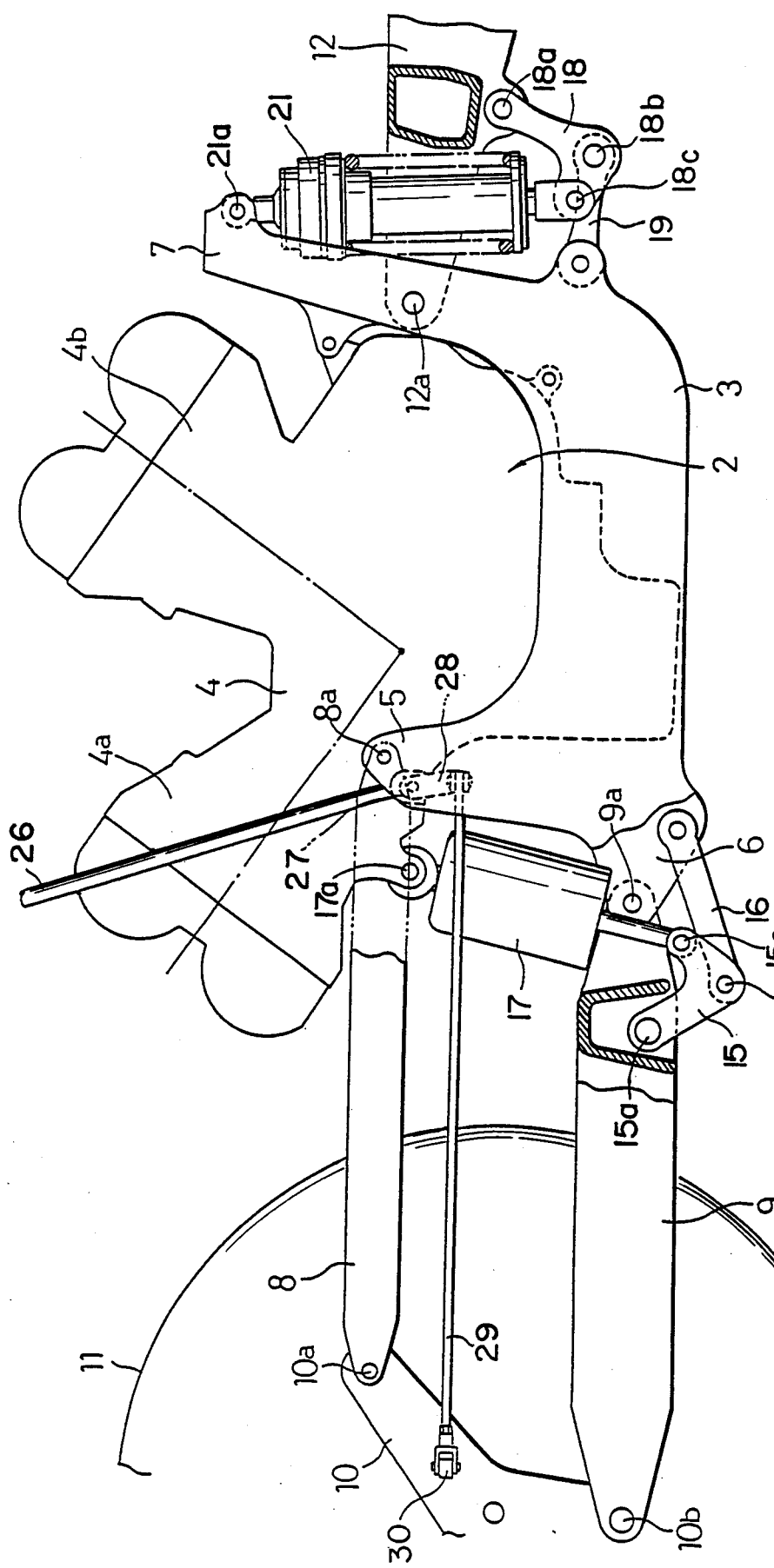
FIG. 7 is a detailed view of the front and rear suspension linkage of the motorcycle of FIG. 6.

Looking next to FIGS. 6 and 7, again identical or similar elements are designated with corresponding reference numerals to the prior embodiments. The motorcycle 1 is shown to have a center power unit 2 including a V-type engine 4. A support member 3 of similar construction to the prior embodiments is also disclosed. Front projections 5 and 6 and rear projections 7 are also included. As with the prior embodiments, the swing arm suspension arms 8 and 9 are similarly arranged and pinned for pivotal movement relative to the projections 5 and 6 of the support member 3. The rear swing arm 12 is also pinned to the upper projection 7 as in the prior embodiments. Furthermore, the linkage mechanism, generally designated 14, and the rear linkage mechanism including elements 18 and 19 for supporting the lower end of cushion members 17 and 21, respectively, are similarly constituted to those of the embodiments discussed above.

The upper end of the cushion member 17 is supported by the front cylinder of the engine 4. The cushion member is mounted at a bracket on the engine at the upper end 17a of the damper 17. This mounting of the upper end 17a of the cushion member on a bracket on the engine 4 avoids use of the support member 3, thereby not requiring additional weight. The cushion member thus extends from the frame structure of the vehicle by the specific attachment to the engine 4 downwardly to the linkage mechanism 14 of the swing arm assembly consisting of arms 8 and 9.

With respect to the upper portion of the motorcycle body, units F such as an air cleaner case 31, a container box 32 and a fuel tank 33 are fixed to a subframe or the power unit 4. See attachment points A and B on FIG. 6. These motorcycle elements are covered by a cowling 34 which is provided with a seat 35 in a rear position thereof, both illustrated in phantom.

The air cleaner case 31 is made of a steel sheet and a bracket 25 mounted onto the air cleaner case 31 rotatably supports a stay of the steering handle 24. The steering system is otherwise as best illustrated in FIG. 3 discussed above.

Figure 8:
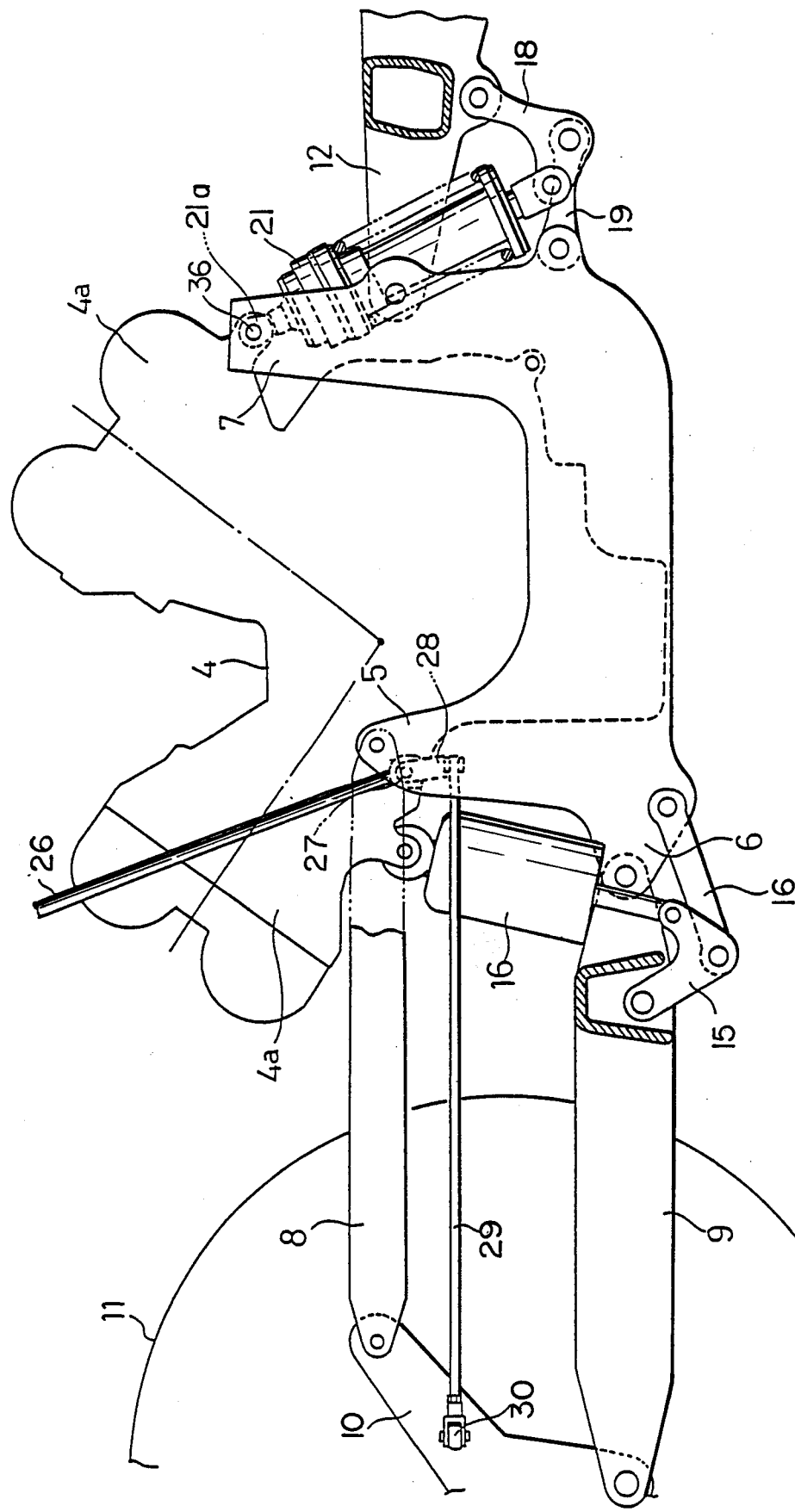
FIG. 8 is a view similar to that of FIG. 7 illustrating yet another embodiment of the suspension linkage.
Figure 9:
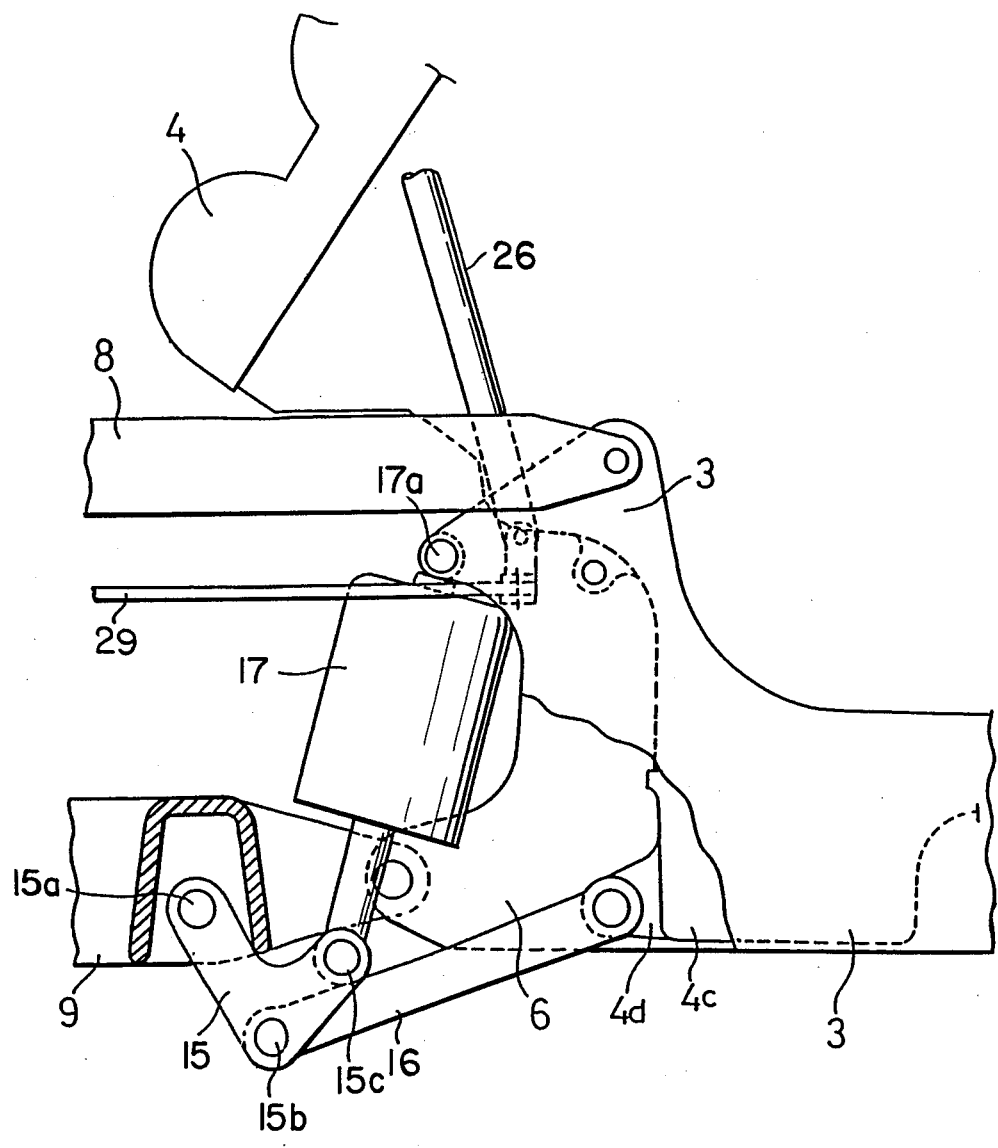
FIG. 9 is a side elevation of a front suspension linkage system of yet another embodiment.

FIGS. 8 and 9 show other embodiments. In the embodiment of FIG. 8, the upper end 21a of the rear shock absorber 21, the rear cylinder 4b of the engine 4 and the top end of the upper projection 7 are connected together by means of a single screw bolt 36, thereby improving the structural strength of the vehicle and reducing the weight of the support member 3.

In the embodiment of FIG. 9, the middle portion 15b of the L-shaped link 15 supporting the lower end of the front cushion member 17 is connected to the engine 4 by means of the bar linkage 16. The bar linkage 16 is coupled by means of a bracket 4d to the engine 4. The bracket projects from an oil pan 4c mounted to the lower end of the engine 4. Thus, the linkage mechanism is coupled with the engine rather than the support member 3 to further reduce the weight thereof.

Thus, improved suspension systems are disclosed for front and rear swing arm suspensions. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A suspension system for a motorcycle having front and rear wheels and a frame structure including a power unit as a structural part thereof, comprising:
   generally horizontally disposed forwardly extending vertically spaced upper and lower front swing arms pivotally mounted at their proximal ends to said frame structure,
   a steering plate extending between and pivotally connecting the distal ends of said upper and lower front swing arms,
   means in said steering plate intermediate the ends thereof for rotably mounting said front wheel,
   a cushion member pivotally mounted at one end to said frame structure, and
   means for connecting the other end of said cushion member to said lower front swing arm, including:
      a generally L-shaped cushion arm pivotally connected at one end to said cushion member and at the other end to said lower front swing arm, and
      a connecting rod extending substantially parallel to said lower swing arm and having one end pivotally connected to said frame structure and its other end pivotally connected to said cushion arm intermediate the ends thereof.

2. The suspension system of claim 1, wherein said one end of said cushion member is mounted to the power unit.

3. The suspension system of claim 1 wherein said cushion arm extends below said lower swing arm and said connecting rod is subjacently spaced therefrom.

4. The suspension system of claim 3 wherein said one end of said connecting rod is connected to said frame structure rearwardly of said proximal end of said lower swing arm and said other end of said connecting rod connects with said cushion arm forwardly of said lower swing arm proximal end.

* * * * *